(12) United States Patent
Park et al.

(10) Patent No.: US 7,171,177 B2
(45) Date of Patent: Jan. 30, 2007

(54) COMMUNICATION APPARATUS AND METHOD USING HUMAN BODY AS MEDIUM

(75) Inventors: Duck Gun Park, Daejeon (KR); Sung Weon Kang, Daejeon (KR); Chang Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/024,050

(22) Filed: Dec. 29, 2004

(65) Prior Publication Data

US 2006/0052056 A1    Mar. 9, 2006

(30) Foreign Application Priority Data

Sep. 7, 2004    (KR) ............... 10-2004-0071085

(51) Int. Cl.
*H04B 1/18* (2006.01)
(52) U.S. Cl. ............... 455/188.1; 455/176.1; 455/168.1; 455/410; 455/15; 455/17; 340/573.1
(58) Field of Classification Search ......... 455/188.1, 455/176.1, 168.1, 410, 15, 17, 100; 340/573.1
See application file for complete search history.

(56) References Cited

U.S. PATENT DOCUMENTS 5,796,827 A * 8/1998 Coppersmith et al. ...... 713/182
6,211,799 B1 * 4/2001 Post et al. .................... 341/33
6,223,018 B1    4/2001 Fukumoto et al.
6,347,095 B1 * 2/2002 Tang et al. ................. 370/469
6,441,721 B1 * 8/2002 Tajima et al. ........... 340/286.01
2004/0235428 A1 * 11/2004 Nagai et al. .................. 455/85

FOREIGN PATENT DOCUMENTS

JP    1995-170215    7/1995

OTHER PUBLICATIONS

T. G. Zimmerman; "Personal Area Networks: Near-field intrabody communication"; IBM Systems Journal, vol. 35; Nos. 3 & 4; 1996; pp. 609-617.

* cited by examiner

*Primary Examiner*—Matthew Anderson
*Assistant Examiner*—Minh Dao
(74) *Attorney, Agent, or Firm*—Mayer Brown Rowe & Maw LLP (57) ABSTRACT

Provided is to a communication apparatus and method using a human body as a medium, in which secure/normal data signals are transmitted/received to the inside and outside of a human body respectively, through at least two different frequency channels classified according to a predetermined reference value, to thereby efficiently use a frequency based on a physical characteristic of a channel and increase a data transmission rate while maintaining security.

18 Claims, 5 Drawing Sheets

COMMUNICATION APPARATUS AND METHOD USING HUMAN BODY AS MEDIUM

CROSS-REFERENCE TO RELATED APPLICATION

This application claims priority to and the benefit of Korean Patent Application No. 2004-71085, filed on Sep. 7, 2004, the disclosure of which is incorporated herein by reference in its entirety.

BACKGROUND

1. Field of the Invention

The present invention relates to a communication apparatus and method using a human body as a medium and, more specifically, to a communication apparatus and method using a human body as a medium, in which secure/normal data signals are transmitted/received to the inside and outside of a human body respectively, through at least two different frequency channels classified according to a predetermined reference value, to thereby efficiently use a frequency based on a physical characteristic of a channel and increase a data transmission rate while maintaining security.

2. Discussion of Related Art

In general, a human body communication refers to a method of transferring signals using a change of an electrical energy using a human body as a medium.

In a scheme proposed by Zimmerman at MIT in the early 1990s, electrical signals having a frequency of less than several hundreds kHz are applied to a human body. However, in the low frequency like this, there is a limit to increasing communication speed, which is lower than that for the other competitive schemes.

Figure 7:
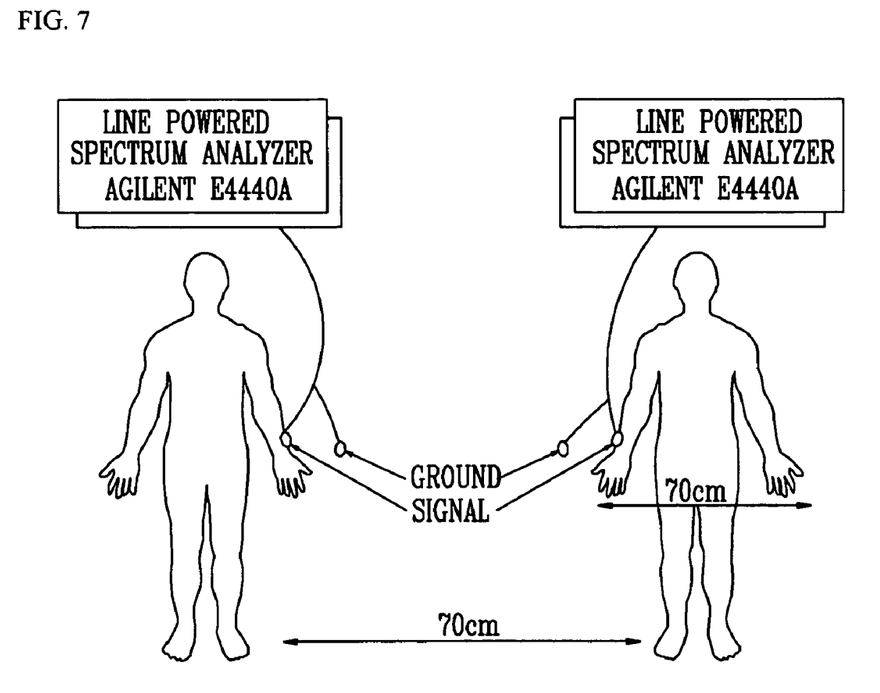
FIG. 7 is a diagram showing a communication using a human body as a medium in mega herz frequency.
Figure 8:
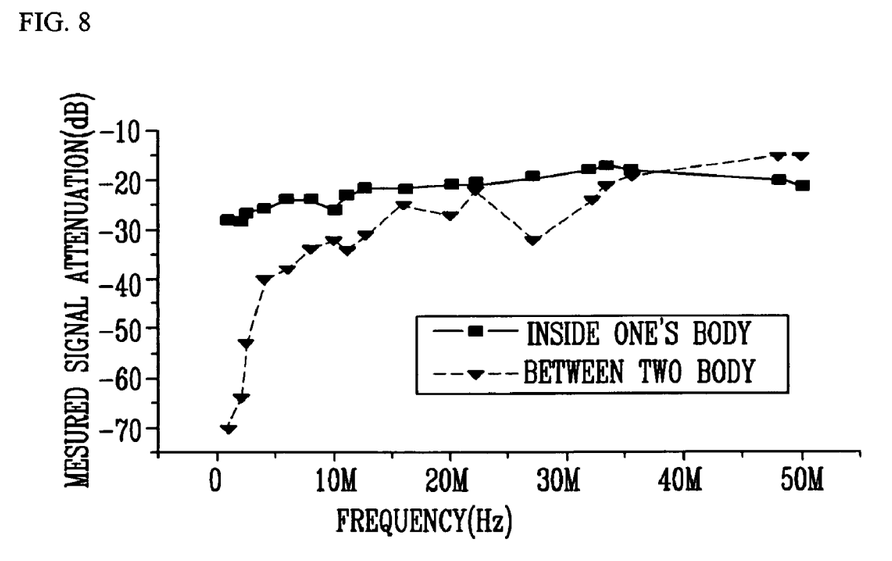
FIG. 8 is a graph showing signal attenuation according to the frequency.

Further, when a high frequency (for example of several tens of mega herz (MHz)) is used, as shown in FIG. 7 and FIG. 8, an electrical energy is not confined in the body and the human body acts as an antenna and the electrical energy is dissipated out of the body. Therefore, security, which is a merit of the human body communication, is not guaranteed.

SUMMARY OF THE INVENTION

The present invention is directed to a communication apparatus and method using a human body as a medium, in which secure/normal data signals are transmitted/received to the inside and outside of a human body respectively, through at least two different frequency channels classified according to a predetermined reference value, to thereby efficiently use a frequency based on a physical characteristic of a channel and increase a data transmission rate while maintaining security.

One aspect of the present invention is to provide a communication apparatus using a human body as a medium, comprising: transmitting means for transmitting secure data signals to the inside of the human body and normal data signals to the outside of the human body through at least two different frequency channels classified according to a predetermined reference value; and receiving means for receiving the secure data signals transmitted through the conductive effect of the human body and the normal data signals transmitted through the radiation effect of the human body.

Another aspect of the present invention is to provide a communication apparatus using a human body as a medium, comprising a transmitting unit for outputting predetermined digital signals; an encoder unit for receiving the output digital signals to classify the signals into secure data signals and normal data signals, respectively, through encryption; a secure frequency modulation unit for receiving the classified secure data signals to modulate through at least one frequency channel classified according to a predetermined reference value; a normal frequency modulation unit for receiving the classified normal data signals to modulate through at least another frequency channel classified according to a predetermined reference value; and a signal synthesis unit for synthesizing the modulated secure and normal data signals to output to the inside and outside of the human body through a predetermined electrode.

Yet another aspect of the present invention is to provide a communication apparatus using a human body as a medium, comprising: a secure frequency demodulation unit for receiving secure data signals transmitted through the conductive effect of the human body to demodulate through at least one frequency channel classified according to a predetermined reference value; a normal frequency demodulation unit for receiving normal data signals transmitted through the radiation effect of the human body to demodulate through at least another frequency channel classified according to a predetermined reference value; a decoder unit for converting the demodulated secure and normal data signals into digital signals; and a receiving unit for receiving the converted digital signals.

Still another aspect of the present invention is to provide a communication method using a human body as a medium, comprising: (a) transmitting secure and normal data signals to the inside and outside of the human body, respectively, through at least two frequency channels classified according to a predetermine reference value; and (b) receiving the secure and normal data signals transmitted through the conductive effect and radiation effect of the human body.

BRIEF DESCRIPTION OF THE DRAWINGS

The above and other features of the present invention will be described in reference to certain exemplary embodiments thereof with reference to the attached drawings in which.

DETAILED DESCRIPTION OF PREFERRED EMBODIMENTS

Exemplary embodiments of the present invention will now be described with reference to the attached drawings. However, these embodiments are illustrative only, and a variety of modification thereof can be made. These embodiments are provided to give a thorough and complete understanding of the present invention to those skilled in the art.

Figure 1:
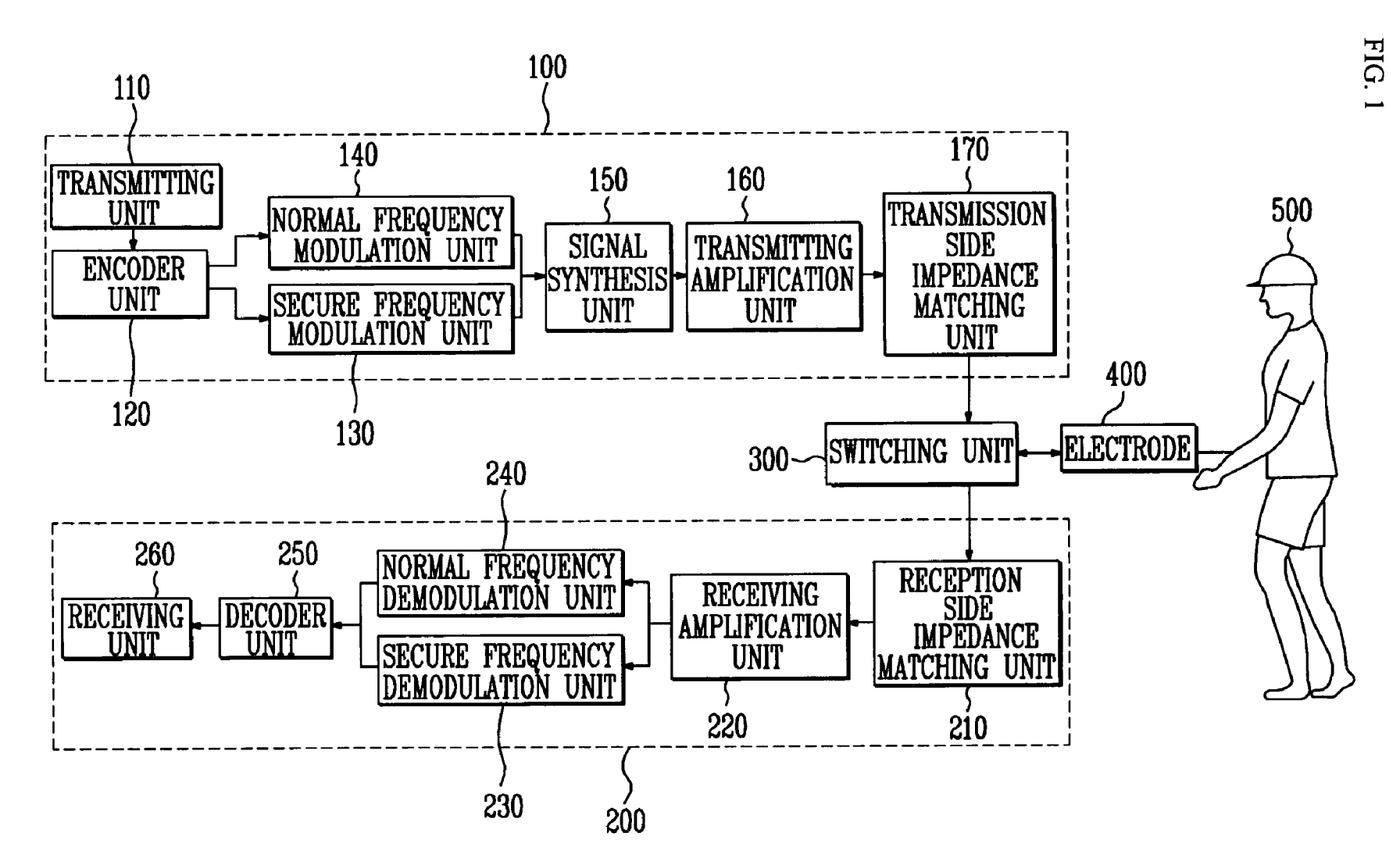
FIG. 1 is a schematic block diagram for explaining a communication apparatus using a human body as a medium according to an embodiment of the present invention.

FIG. 1 is a schematic block diagram for explaining a communication apparatus using a human body as a medium according to an embodiment of the present invention.

Referring to FIG. 1, a communication apparatus using a human body as a medium according to an embodiment of the present invention largely includes a transmitting module unit 100 and a receiving module unit 200, transmitting and receiving predetermined secure and normal data signals through the conductive effect and the radiation effect of a conductive medium, or a human body 500, respectively.

Here, the transmitting module unit 100 serves to transmit the secure/normal data signals through the conductive effect/radiation effect of the human body, respectively, using at least two different frequency channels classified according to a predetermined reference value. At the time, the reference value refers to a frequency variation value based on a distance from a signal source, i.e., the human body 500, which preferably has frequency channels in a range of 1 MHz to 10 MHz.

The transmitting module unit 100 includes a transmitting unit 110, an encoder unit 120, a secure frequency modulation unit 130, a normal frequency modulation unit 140, and a signal synthesis unit 150.

The transmitting unit 110 serves to output predetermined digital signals (e.g., character signals, video signals, audio signals, and physiological signals detected from the human body).

The encoder unit 120 receives the predetermined digital signals output from the transmitting unit 110 and classifies the signals into the secure/normal data signals through any type of encryption. In other words, the encoder unit 120 receives any secure data signals (e.g., encryption key) generated from any key generator (not shown), and using the received data signals, converts the original digital signals into encrypted digital signals, i.e., encrypted normal data signals.

The secure frequency modulation unit 130 receives the secure data signals output from the encoder unit 120 and modulates the secure data signals through at least one frequency channel (hereinafter, referred to as a 'secure frequency channel') classified according to the predetermined reference value. Here, the secure frequency channel is preferably in a range of 1 MHz or less.

In other words, the secure frequency modulation unit 130 receives any secure data signals generated from any key generator (not shown), multiplies the data signals by a carrier of the secure frequency output from a secure frequency carrier oscillator (not shown) according to a frequency modulation scheme, and outputs the resultant value.

The normal frequency modulation unit 140 receives normal data signals output from the encoder unit 120 and modulates the normal data signals through at least another different frequency channel (hereinafter, referred to as a 'normal frequency channel') classified according the predetermined reference value. Here, the normal frequency channel is in a range of 10 MHz or more.

In other words, the normal frequency modulation unit 140 receives encrypted normal data signals output from the encoder unit 120, multiplies the encrypted normal data signals by a carrier of the normal frequency output from a normal frequency carrier oscillator (not shown) according to a frequency modulation scheme, and outputs the resultant value.

The signal synthesis unit 150 serves to synthesize the secure/normal data signals modulated by the secure frequency modulation unit 130 and the normal frequency modulation unit 140, respectively.

In addition, a transmitting amplification unit 160 connected to an output stage of the signal synthesis unit 150, for receiving synthesized data signals from the signal synthesis unit 150 to amplify the synthesized data signals in a certain size in consideration with signal attenuation may be further included.

In addition, a transmission side impedance matching unit 170 connected to an output stage of the transmitting amplification unit 160, for matching data signals amplified by the transmitting amplification unit 160 with an impedance of the human body 500 such that data signals are effectively transferred to the human body to the utmost may be further included. Here, the transmission side impedance matching unit 170 may be directly connected to the output stage of the signal synthesis unit 150.

In addition, in order to prevent data signals output from the transmission side impedance matching unit 170 from flowing into the receiving module unit 200, a switching unit 300 that connects the transmitting module unit 100 and the receiving module unit 200 may be further included.

In addition, the data signals output from the switching unit 300 may be transferred to the inside/outside of the human body through a physical interface connected to the human body 500, i.e., through a predetermined electrode 400.

The receiving module unit 200 serves to receive secure/normal data signals transmitted from other communication apparatuses through the conductive effect/radiation effect of the human body 500.

The receiving module unit 200 includes a secure frequency demodulation unit 230, a normal frequency demodulation unit 240, a decoder unit 250, and a receiving unit 260.

The secure frequency demodulation unit 230 serves to demodulate the data signals amplified from the receiving amplification unit 220 into the original secure data signals through the secure frequency channels classified according to a predetermined reference value In other words, the data signals are classified using a secure frequency bandpass filter (not shown), and the signals in the classified secure frequency are multiplied with a carrier of the secure frequency output from the secure frequency carrier oscillator according to a frequency demodulation scheme to be recovered into the original secure data signals. Here, a digitizer (not shown) performing clock recovery and amplitude clipping can be used to recover the signals in a digital format.

The normal frequency demodulation unit 240 serves to demodulate the data signals amplified by the receiving amplification unit 220 into the original encrypted normal data signals through the normal frequency channels classified according to the predetermined reference value.

In other words, the data signals are classified into the normal frequency signals using a normal frequency bandpass filter (not shown), and the classified normal frequency signals are multiplied with a carrier of the normal frequency output from the normal frequency carrier oscillator (not shown) according to a frequency demodulation scheme such that the original encrypted normal data signals are recovered. Here, a digitizer (not shown) performing clock recovery and amplitude clipping can be used to recover the signals in a digital format.

The decoder unit 250 serves to recover the secure data signals and the encrypted normal data signals recovered from the secure frequency demodulation unit 230 and the normal frequency demodulation unit 240 into the original digital signals.

The receiving unit 260 serves to receive the original digital signals recovered from the decoder unit 250.

In addition, in order to effectively transfer the data signals transmitted through the switching unit 300 to the human body 500 to the utmost, a reception side impedance matching unit 210 for matching the data signals with an impedance of the human body 500 may be further included.

In addition, a receiving amplification unit 220 connected to an output stage of the reception side impedance matching unit 210, for receiving the data signals output from the reception side impedance matching unit 210 to amplify the data signals in a certain size in consideration with signal attenuation may be further included. Here, the receiving amplification unit 220 may be directly connected to an output stage of the switching unit 300.

Further, although the communication apparatus using a human body as a medium according to an embodiment of the present invention is implemented using the transmitting module unit 100 and the receiving module unit 200, the present invention is not limited thereto, and the transmitting module unit 100 and the receiving module unit 200 can be implemented separately.

Figure 2A:
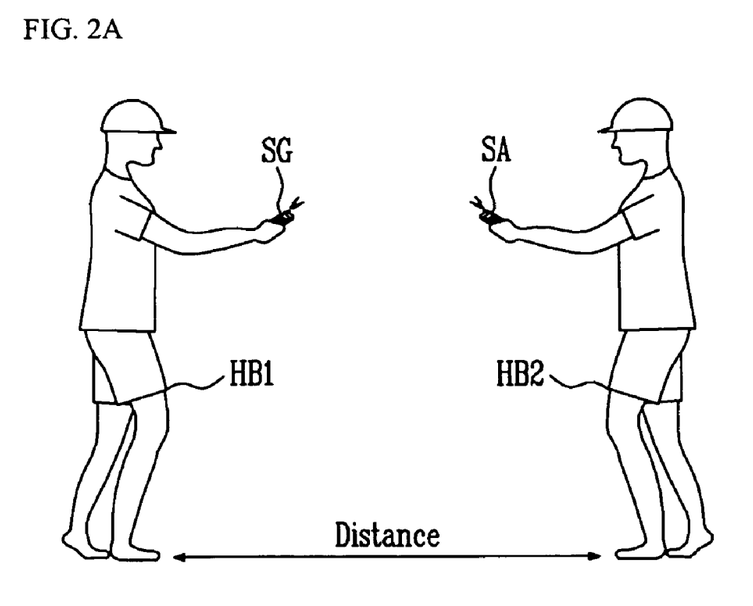
FIGS. 2A and 2B are diagrams showing examples for explaining characteristics of multiple frequencies of a communication apparatus using a human body as a medium according to an embodiment of the present invention.
Figure 2B:
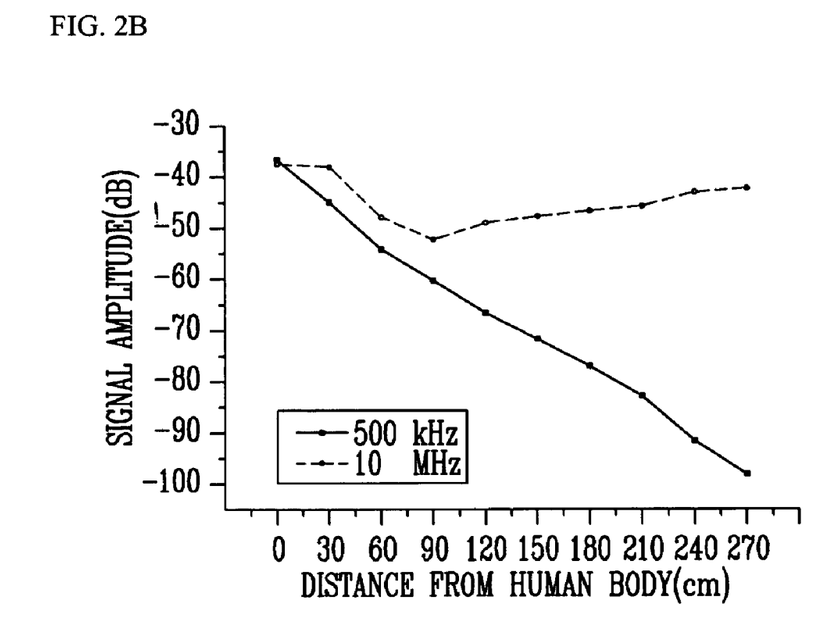

FIGS. 2A and 2B are diagrams showing examples for explaining characteristics of multiple frequencies of a communication apparatus using a human body as a medium according to an embodiment of the present invention, where FIG. 2A is a schematic diagram of an example for explaining a signal amplitude dBm according to a distance from a signal source, i.e., a human body, using different frequency channels (secure/normal frequency channels) from each other, and FIG. 2B is a graph showing the result according to the example of FIG. 2A.

Referring to FIG. 2A, a signal generator SG, e.g., E4438C for generating a predetermined signal is mounted on a first human body (HB1), and a spectrum analyzer SA, e.g., E4407B for measuring a signal's amplitude generated from the signal generator SG is mounted on a second human body HB2.

With this arrangement, a predetermined signal is generated through the signal generator SG, and the generated signal is transferred to the first human body (HB1) through a predetermined electrode (400, refer to FIG. 1), and using the spectrum analyzer SA mounted on the second human body HB2, the generated signal's amplitude is measured.

Here, the amplitude of the generated signals is 0 dBm, and the different frequency channels selected frequency bands of 500 kHz and 10 MHz, respectively. In addition, on the assumption that the distance between the first human body (HB1) and the second human body (HB2) is 0 cm when grasping hands, the signal's amplitude was measured while increasing the distance to 30 cm. The specific result of the example is shown in the following Table 1.

TABLE 1

| Distance (cm) | 500 kHz (dBm) | 10 MHz (dBm) |
|---|---|---|
| 0 | −36.52 | −37.5 |
| 30 | −45.6 | −38.2 |

TABLE 1-continued

| Distance (cm) | 500 kHz (dBm) | 10 MHz (dBm) |
|---|---|---|
| 60 | −54.2 | −47.9 |
| 90 | −60.2 | −51.6 |
| 120 | −66.1 | −49.3 |
| 150 | −71.18 | −47.8 |
| 180 | −76.7 | −46.6 |
| 210 | −82.8 | −45.6 |
| 240 | −91.2 | −43.6 |
| 270 | −98.7 | −42.9 |

Referring to Table 1 and FIG. 2B, as the distance increases, the signals in the frequency band of 500 kHz are rapidly reduced, but the signals in the frequency band of 10 MHz remain relatively constant irrespective of the distance. Therefore, using these features, the signals in the frequency band of 500 kHz, of the predetermined secure data signals, are transferred through the secure frequency channels, and the signals in the frequency band of 10 MHz, or the predetermined encrypted normal data signals, are transferred to the normal frequency channels, so that the human body having a large distance does not receive the secure data signals transmitted through the secure frequency channels. Accordingly, security can be effectively maintained.

In other words, when the human body is considered to a conductive material, the secure data signals transmitted through the secure frequency channels (e.g., about 1 MHz or less) are transmitted through a capacitive coupling with ground, and the encrypted normal data signals transmitted through the normal frequency channels (e.g., about 10 MHz or more) are transmitted using the human body as an antenna such that an electromagnetic wave resonating with a center of the human body is radiated into the air.

As described above, a unique difference is shown due to the difference of the transmission mechanisms of the secure frequency channels and the normal frequency channels, respectively. For the secure frequency channel, the signal transmission is confined into the body, so that the security is good, the frequency interference is small, and the signals are transferred using the human body as an antenna. Thus, a space as much as a length of an antenna required in a used band can be saved. In addition, due to a high frequency, the data transmission rate that can be implemented can be increased, and the signal transmission is also implemented in the distance a bit far from the human body (e.g., within about 1 m).

Figure 3:
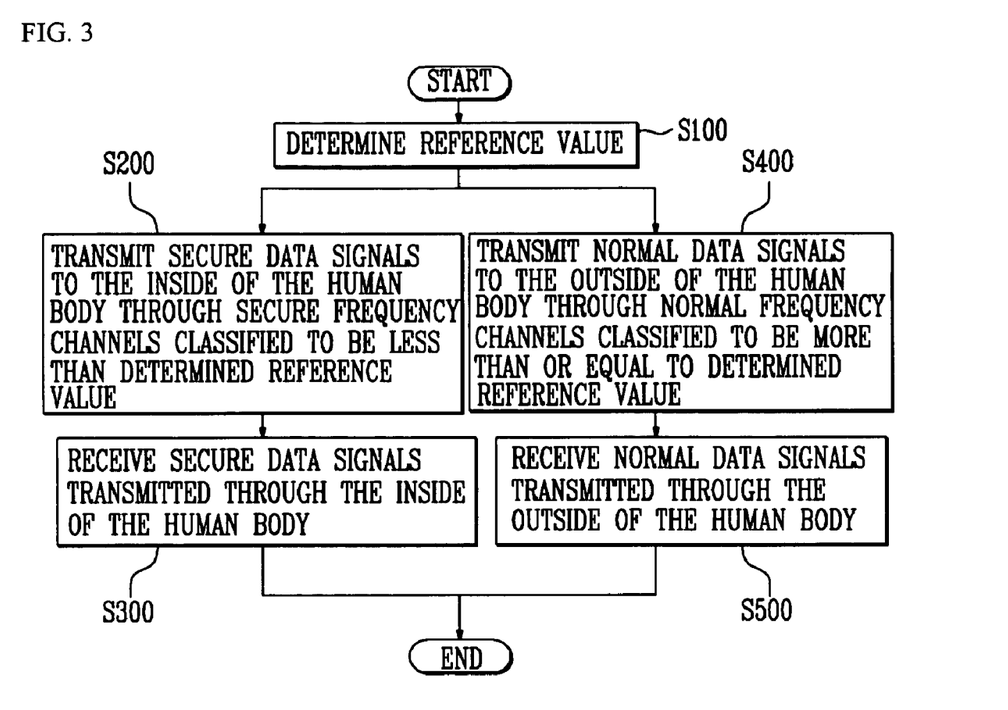
FIG. 3 is a flow chart for explaining a communication method using a human body as a medium according to an embodiment of the present invention.

FIG. 3 is a flow chart for explaining a communication method using a human body as a medium according to an embodiment of the present invention.

Referring to FIG. 3, first, in step S100, a reference value for classifying secure/normal frequency channels is determined. Next, in step S200, secure data signals are transmitted inside the human body through the secure frequency channels classified to be below than the determined reference value, and in step S300, the secure data signals transmitted inside the human body are received.

Further, in step S400, normal data signals are transmitted outside the human body through the normal frequency channels classified to be more than or equal to the determined reference value, and in step S500, the normal data signals transmitted outside the human body are received.

Figure 4:
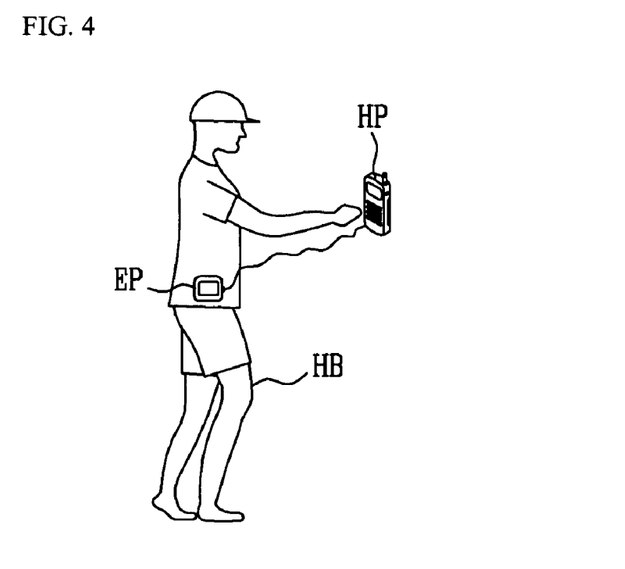
FIG. 4 is a diagram for explaining an inside communication of a human body by a communication apparatus using a human body as a medium according to an embodiment of the present invention.

FIG. 4 is a diagram for explaining an inside communication of a human body by a communication apparatus using a human body as a medium according to an embodiment of the present invention.

Referring to FIG. 4, an electronic commerce is performed through the frequency channels less than or equal to the predetermined reference value, i.e., the secure frequency channels, using an electronic purse EP and a cellular phone HP arranged at the human body. Confidential information in the electronic purse EP, i.e., the secure data signals, is transmitted to the cellular phone HP through the conductive effect of the human body HB to acknowledge the electronic commerce.

Figure 5:
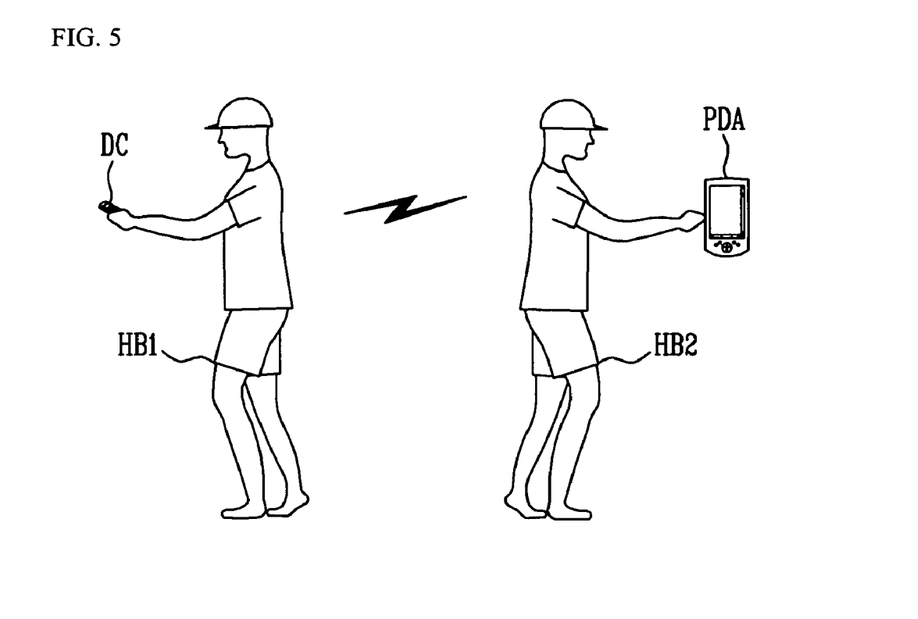
FIG. 5 is a diagram for explaining an outside communication of a human body by a communication apparatus using a human body as a medium according to an embodiment of the present invention.

FIG. 5 is a diagram for explaining an outside communication of a human body by a communication apparatus using a human body as a medium according to an embodiment of the present invention.

Referring to FIG. 5, a communication between two human bodies HB1 and HB2 spaced apart by a predetermined distance through the frequency channels more than or equal to the predetermined reference value, i.e., the normal frequency channels, is shown. The photographs taken by a digital camera DC arranged at the first human body HB1, i.e., normal data signals, are transmitted to the second human body HB2 using the first human body HB1 as an antenna, and received by a personal digital assistants PDA arranged at the second human body.

Figure 6:
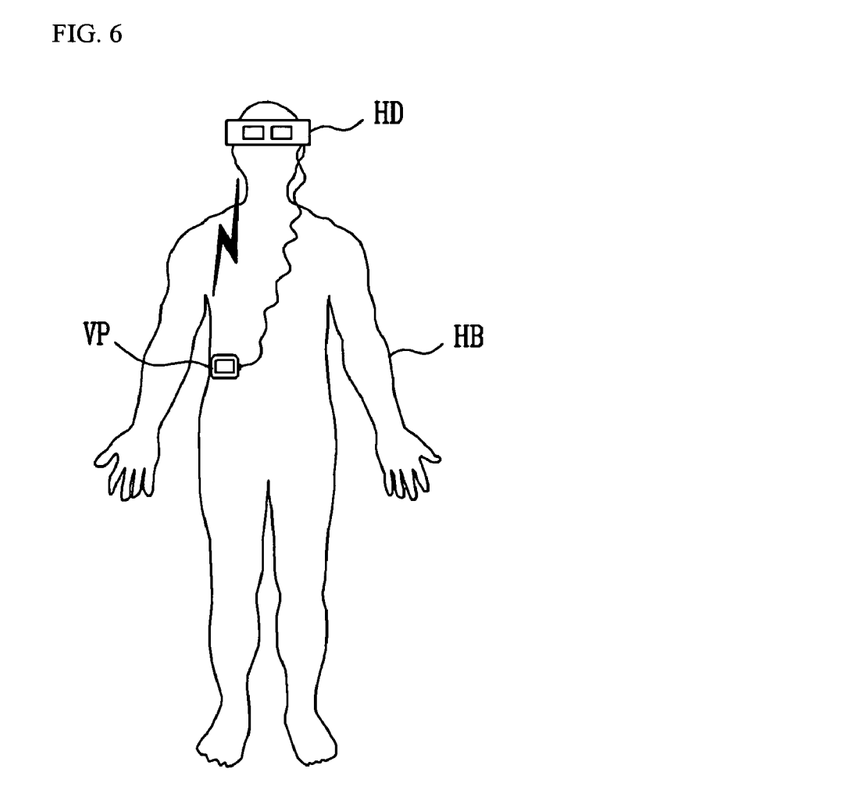
FIG. 6 is a diagram for explaining communications inside/outside a human body by a communication apparatus using a human body as a medium according to an embodiment of the present invention.

FIG. 6 is a diagram for explaining inside/outside communications of a human body by a communication apparatus using a human body as a medium according to an embodiment of the present invention.

Referring to FIG. 6, in which the communication is made through the conductive effect/radiation effect of the human body HB using the secure frequency channels and the normal frequency channels at the same time, video signals output from a portable video player VP arranged at the human body HB are transmitted to a head mount display HD through the conductive effect/radiation effect of the human body HB.

In other words, the video signals output from the portable video player VP are classified into the secure data signals and the encrypted normal data signals through any type of encryption, and the secure data signals are transmitted to the inside of the human body (HB) through the secure frequency channels while the encrypted normal data signals are transmitted to the outside of the human body (HB) through the normal frequency channels using the human body HB as an antenna. Therefore, only the encrypted normal data signals are received at the outside of the human body HB, so that the security is maintained. Further, the encrypted normal data signals are transmitted through the normal frequency channels, which are a relatively high frequency, so that the high data transmission rate can be achieved.

As described above, according to a communication apparatus and method using a human body as a medium, secure/normal data signals are transmitted/received to the inside and outside of a human body, respectively, through at least two different frequency channels classified according to a predetermined reference value, to thereby efficiently use a frequency based on a physical characteristic of a channel and increase a data transmission rate while maintaining security.

Although communication apparatus and method using a human body as a medium has been described in the exemplary embodiments of the present invention, the present invention is not limited thereto, and a variety of modification can be made within the scope of the claims, the detailed description of the invention, and the attached drawings, which are also included in the present invention.

What is claimed is:

1. A communication apparatus using a human body as a medium, comprising:
   transmitting means for transmitting secure data signals to the inside of the human body and normal data signals to the outside of the human body through at least two different frequency channels classified according to a predetermined reference value to use a frequency based on a physical characteristic of a channel and increase a data transmission rate while maintaining security; and
   receiving means for receiving the secure data signals transmitted through the conductive effect of the human body and the normal data signals transmitted through the radiation effect of the human body.

2. The communication apparatus as set forth in claim 1, wherein the different frequency channels are classified into secure frequency channels and normal frequency channels,
   wherein the secure frequency channels are in a range of 1 MHz or less, and
   wherein the normal frequency channels are in a range of 10 MHz or more.

3. The communication apparatus as set forth in claim 1, wherein the reference value is a frequency variation value according to a distance from the human body.

4. The communication apparatus as set forth in claim 3, wherein the reference value is a frequency channel in a range of 1 MHz to 10 MHz.

5. The communication apparatus as set forth in claim 1, wherein the transmitting means comprises:
   a transmitting unit for outputting predetermined digital signals;
   an encoder unit for receiving the output digital signals to classify the signals into the secure data signals and the normal data signals, respectively, through encryption;
   a secure frequency modulation unit for receiving the classified secure data signals to modulate through at least one frequency channel;
   a normal frequency modulation unit for receiving the classified normal data signals to modulate through at least another frequency channel; and
   a signal synthesis unit for synthesizing the modulated secure and normal data signals to output to the inside and outside of the human body through a predetermined electrode.

6. The communication apparatus as set forth in claim 1, wherein the receiving means comprises:
   a secure frequency demodulation unit for receiving the transmitted secure data signals through the conductive effect of the human body to demodulate through at least one frequency channel;
   a normal frequency demodulation unit for receiving the transmitted normal data signals through the radiation effect of the human body to demodulate through at least another frequency channel;
   a decoder unit for converting the demodulated secure and normal data signals into digital signals; and
   a receiving unit for receiving the converted digital signals.

7. A communication apparatus using a human body as a medium, comprising
   a transmitting unit for outputting predetermined digital signals;
   an encoder unit for receiving the output digital signals to classify the signals into secure data signals and normal data signals, respectively, through encryption;
   a secure frequency modulation unit for receiving the classified secure data signals to modulate through at least one frequency channel classified according to a predetermined reference value;

a normal frequency modulation unit for receiving the classified normal data signals to modulate through at least another frequency channel classified according to a predetermined reference value; and a signal synthesis unit for synthesizing the modulated secure and normal data signals to output to the inside and outside of the human body through a predetermined electrode;

wherein the secure data signals are transmitted to the inside of the human body and normal data signals to the outside of the human body through at least two different frequency channels classified according to a predetermined reference value to use a frequency based on a physical characteristic of a channel and increase a data transmission rate while maintaining security.

8. The communication apparatus as set forth in claim 7, further comprising a transmitting amplification unit for amplifying the secure and normal data signals output from the signal synthesis unit in a certain size.

9. The communication apparatus as set forth in claim 7, further comprising a transmission side impedance matching unit for matching the secure and normal data signals output from the signal synthesis unit with an impedance of the human body to facilitate signal transmission.

10. A communication apparatus using a human body as a medium, comprising:

a secure frequency demodulation unit for receiving secure data signals transmitted through the conductive effect of the human body to demodulate through at least one frequency channel classified according to a predetermined reference value;

a normal frequency demodulation unit for receiving normal data signals transmitted through the radiation effect of the human body to demodulate through at least another frequency channel classified according to a predetermined reference value;

a decoder unit for converting the demodulated secure and normal data signals into digital signals; and a receiving unit for receiving the converted digital signals;

wherein the data signals are transmitted through at least two different frequency channels classified according to a predetermined reference value to use a frequency based on a physical characteristic of a channel and increase a data transmission rate while maintaining security.

11. The communication apparatus as set forth in claim 10, further comprising a receiving amplification unit for amplifying the secure and normal data signals received through the conductive effect and radiation effect of the human body in a certain size.

12. The communication apparatus as set forth in claim 10, further comprising a reception side impedance matching unit for matching the secure and normal data signals received through the conductive effect and radiation effect of the human body with an impedance of the human body to facilitate signal transmission.

13. The communication apparatus as set forth in claim 10, further comprising a switching unit for transferring the secure and normal data signals transmitted and received through the conductive effect and radiation effect of the human body to the transmission and reception sides, respectively.

14. A communication method using a human body as a medium, comprising:

(a) transmitting secure and normal data signals to the inside and outside of the human body, respectively, through at least two frequency channels classified according to a predetermine reference value to use a frequency based on a physical characteristic of a channel and increase a data transmission rate while maintaining security; and (b) receiving the secure and normal data signals transmitted through the conductive effect and radiation effect of the human body.

15. The communication method as set forth in claim 14, wherein, in the step (a), the secure data signals are transmitted through at least one frequency channel classified less than the predetermined reference value, and the normal data signals are transmitted through at least another frequency channel classified more than or equal to the predetermined reference value.

16. The communication method as set forth in claim 14, wherein the different frequency channels are classified into secure frequency channels and normal frequency channels, wherein the secure frequency channels are in a range of 1 MHz or less, and wherein the normal frequency channels are in a range of 10 MHz or more.

17. The communication method as set forth in claim 14, wherein, in the step (a), the reference value is a frequency variation value according to a distance from the human body.

18. The communication method as set forth in claim 17, wherein the reference value is a frequency channel in a range of 1 MHz to 10 MHz.

* * * * *